INVENTOR
William Dale Winders

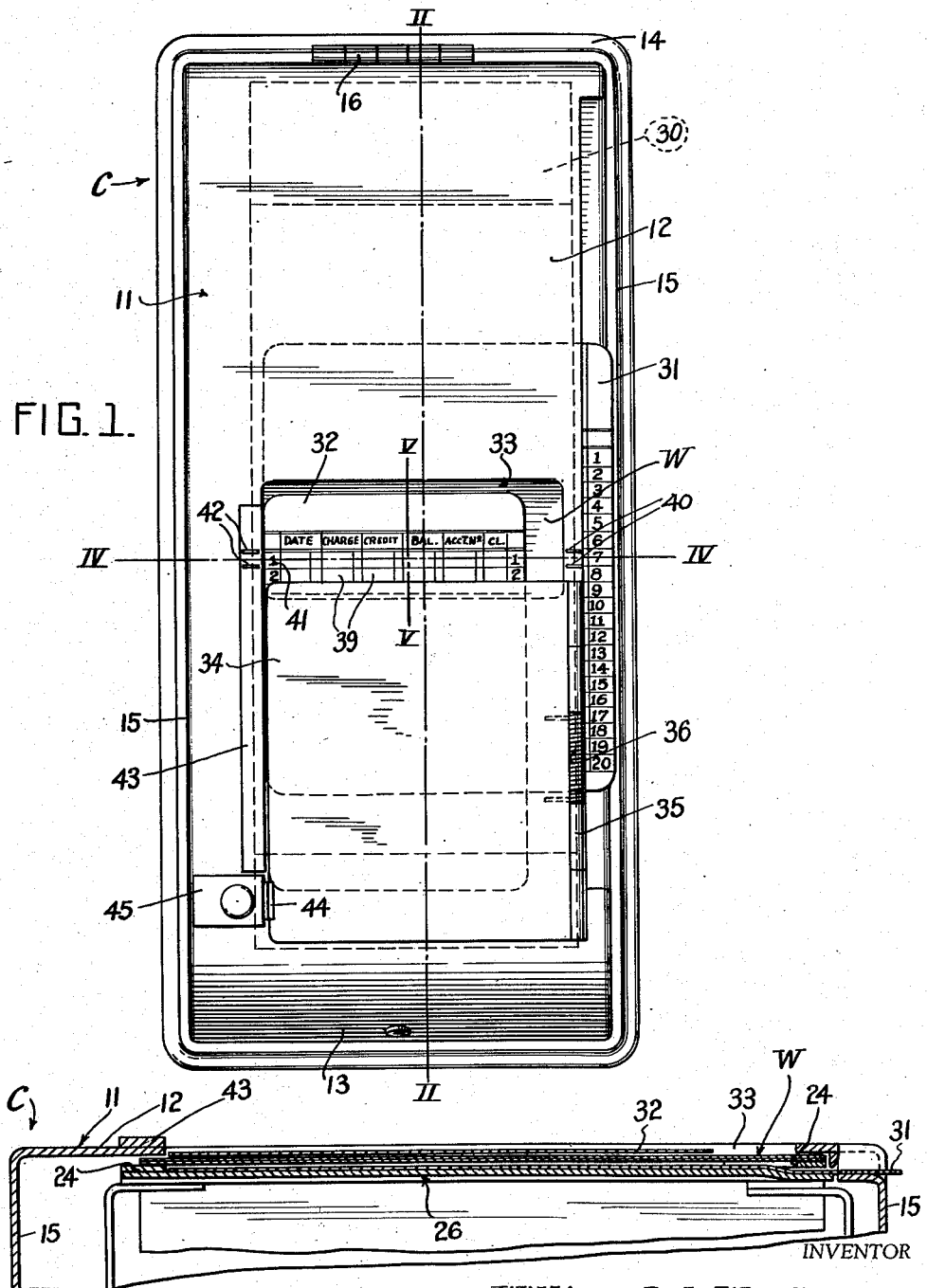

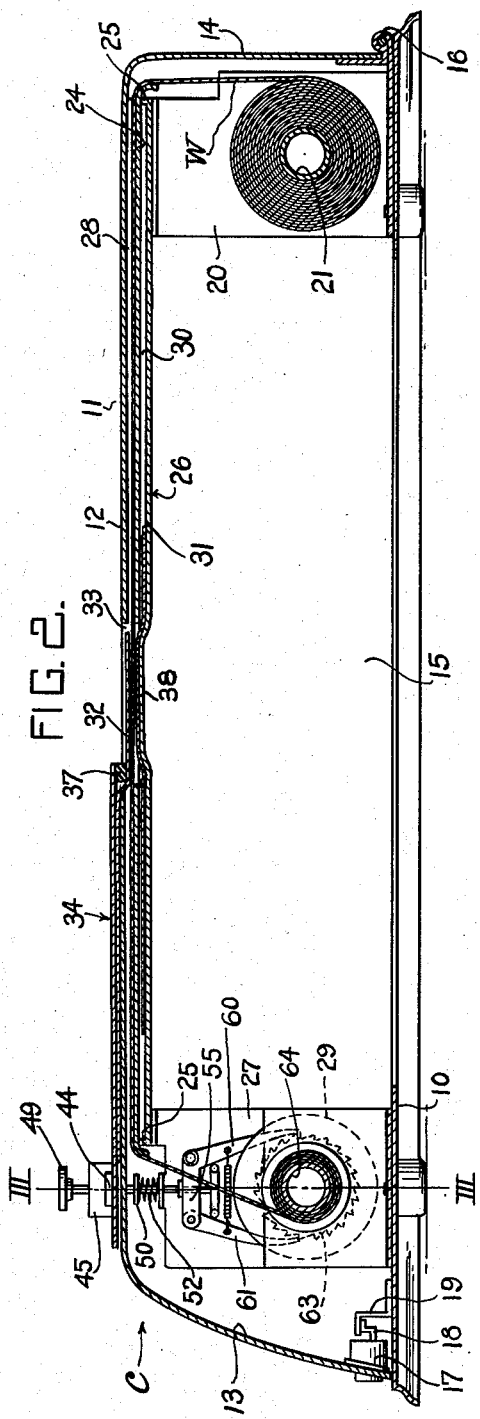

BY *W. S. McDowell*
ATTORNEY

Patented Oct. 20, 1953

2,656,199

UNITED STATES PATENT OFFICE 2,656,199

REGISTER APPARATUS FOR PRODUCING MANIFOLDED BUSINESS RECORDS

William Dale Winders, Columbus, Ohio

Application November 27, 1950, Serial No. 197,740

3 Claims. (Cl. 282—5)

This invention relates to an improved register of the type employed in producing manifolded records of various business transactions.

More particularly, the present invention provides a register for use in the making and keeping of accurate records employed in business systems of the type in which purchasers or customers of business concerns are provided with an account sheet, pass book or record card, while the management of such a concern retains a record in the form of a ledger sheet or card covering the transactions involved in each customer's account, the entries made on the ledger sheet or card corresponding with those appearing on the customer's account sheet or card.

When a customer makes a purchase or payment, the two record sheets or cards are adapted to be placed in adjacent relationship with a web of carbon or other transfer paper placed between them, whereby an entry made on a card or sheet occupying an uppermost position will be transmitted to the carbon web and thence to an underlying sheet or card. In this system, three records are produced simultaneously: first, the entry on the customer's sheet or card; second, a corresponding entry on an impression-receiving and transmitting carbon-type paper webbing or tape; and, third, a carbon paper transmitted impression on the underlying record card or sheet.

In carrying out this system, the carbon impression-receiving and transmitting webbing involves ordinarily a pair of superposed strips, one strip being placed above the other in registering but separable relationship, with the under side of the upper strip coated with an impression-imparting material and likewise the under side of the second or lower strip, whereby an impression imparted to the upper strip of the webbing, as by marking on a superposed record sheet or card, will be transmitted and inscribed on the upper surface of the under strip of webbing. In addition, the under strip serves to transmit the same impression to an underlying record sheet or card placed in the register beneath the webbing. In this arrangement, a record strip or tape is provided by the webbing which is retained and locked within the confines of the machine, so that the entries appearing thereon can not be altered or varied in any way.

Among the objects of the invention are: to provide an improved entry-manifolding register employing a movable impression-transferring and record-forming web carried by and extending between spooling rolls mounted in longitudinally spaced relation in the register, and wherein the register is formed with a casing provided with improved guide means for bringing into entry-receiving relationship with said web a pair of separable record-receiving sheets or cards, whereby inscriptions applied to an upper sheet or card supported in the guides of the machine are simultaneously applied to the web and an underlying sheet or card.

It is another object of the invention to provide an improved register of this character in which provision is made for locking an impression-transferring and record-receiving web within the confines of the register, so that while the web is retained in the register, inscriptions applied thereto cannot, without detection, be altered or varied from the original form of the inscriptions or markings applied thereto from a superposed and removable record-receiving sheet.

It is a further object of the invention to provide a register of this character in which a movable clamping plate is mounted on the upper surface of an outer casing of the register for retaining a separable uppermost record in manifolding relationship with underlying records, and wherein provision is made for latching the clamping plate in its active record-holding position.

It is another object of the invention to provide a register of this nature in which an impression-transferring and record-receiving webbing is utilized, and wherein means are provided for imparting predetermined incremental movement to the webbing with each entry-marking operation of the register so that unused and fresh carbon or impression-transferring surfaces of the webbing are present at all times for inscription-manifolding purposes, as well as providing proper spacing of entries appearing on the webbing itself.

It is a further object of the invention to provide mechanism in a register of the character set forth for imparting movement to a carbon webbing through the operation of a manually actuated latching device employed in maintaining a clamping plate in active clamping relation with an associated and separable record sheet or card, so that in the normal operation of the register, the webbing will be advanced without requiring thought or care on the part of the register operator or user.

The present invention further aims to improve record-keeping apparatus of the character set forth by simplifying the mechanical construction thereof, rendering such apparatus more positive in its operation and convenient to employ, to provide a greater protection for the record-receiving transfer webs employed in connection therewith by preventing tampering or other unauthorized manipulation therewith or the records appearing thereon, and to improve generally apparatus of this character.

For a further understanding of the invention, reference is to be had to the following description and the accompanying drawings, wherein:

Fig. 1 is a top plan view of a manifolding register formed in accordance with the present invention;

Fig. 2 is a vertical longitudinal sectional view taken through the register on the plane indicated by the line II—II of Fig. 1;

Fig. 3 is a vertical transverse sectional view taken through the register on the plane disclosed by the line III—III of Fig. 2;

Fig. 4 is an enlarged vertical transverse sectional view on the plane indicated by the line IV—IV of Fig. 1;

Fig. 5 is a detail longitudinal sectional view on the plane indicated by the line V—V of Fig. 1;

Figure 6:
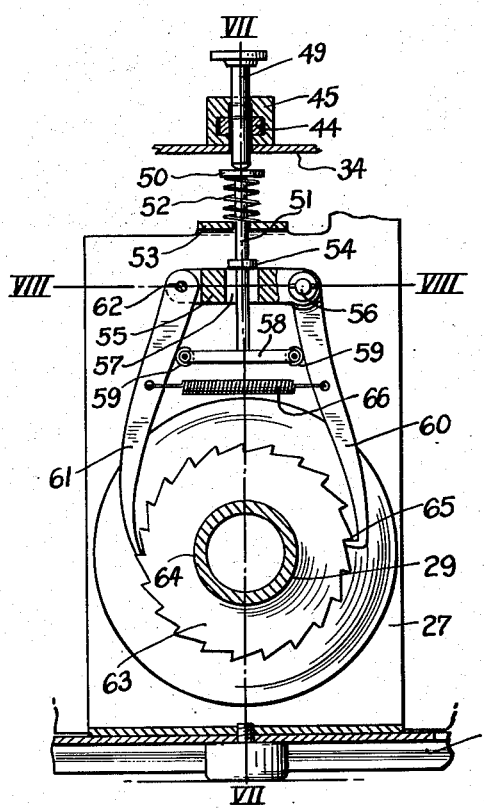
Fig. 6 is a detail vertical longitudinal sectional view taken through the latching mechanism for the clamping plate and the actuating means associated therewith for governing the rotation of a web-winding spool.
Figure 7:
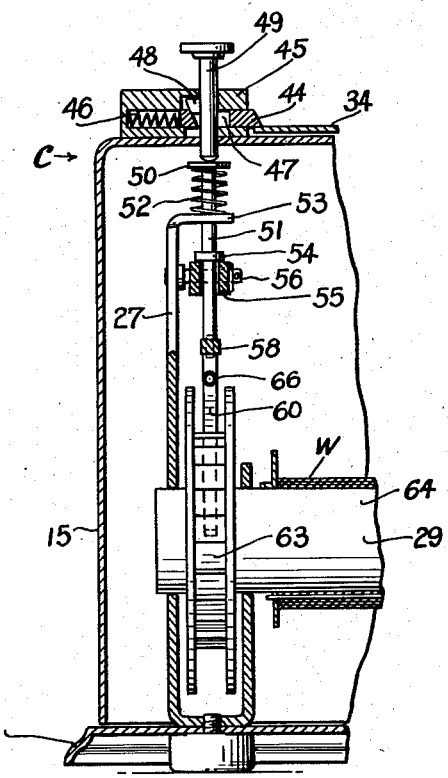
Fig. 7 is a sectional view on the transverse vertical plane indicated by the line VII—VII of Fig. 6.
Figure 8:
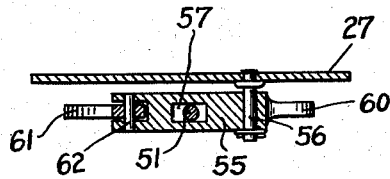
Fig. 8 is a horizontal sectional view on the line VIII—VIII of Fig. 6.

Referring more particularly to the drawings, there has been illustrated a single preferred embodiment of the register mechanism forming the present invention, and while this embodiment has been illustrated and hereafter described in detail, it will be appreciated that the disclosure is presented by way of illustration and that the construction of the mechanism is subject to certain variation or modification within the scope of the invention and the claims presented therefor.

As shown, the register or account-keeping machine comprises a casing C, which embodies a base section 10 and with which is associated a movable cover section, the latter embodying generally a horizontally disposed top wall 12, front and rear end walls 13 and 14, respectively, and longitudinally extending side walls 15, the bottom of the cover section being open and arranged over the base section 10. In this instance, the lower edge of the rear end wall 14 is hinged as at 16 to the base section 10, so that the cover section may swing bodily about the horizontal axis of its hinge connection with the base section.

The front end wall 13 is provided internally, adjacent to the lower edge thereof, with a key-actuated lock mechanism 17, the latter including a sliding bolt 18 which cooperates with a stationary keeper plate 19 arising from the base section 10. By the insertion of a proper key in the lock mechanism, the bolt of the latter may be withdrawn from engagement with the keeper plate, permitting of the swinging movement of the cover section 11 between opened and closed positions. In the drawings, the cover section has been shown in its closed position.

Mounted on the base section 10 at the rear of the machine is a bracket structure 20 in which is rotatably mounted a spool 21. Wound spirally about this spool is a tape or webbing W which comprises, in its preferred form, elongated upper and lower strips of paper 22 and 23, the upper strip having its under surface coated with an impression-transferring substance, such as carbon or graphite. Also, the lower strip 23 has its under surface provided with a corresponding coating. However, the upper surface of the lower strip 23 possesses a coloration so that legible inscriptions may be imparted thereto from the carbon coated under surface of the upper strip 22. Preferably, in the use of the register, the strips 22 and 23 form a composite webbing, and are handled as a single strip. However, after the webbing has been removed from the register, the strips 22 and 23 may be separated in order that the inscriptions appearing on the top surface of the under strip or sheet 23 may be employed as a daily receipts record, or in other capacities. While I have stated that the webbing W comprises but two sheets, it is apparent that the same may consist of any desired number which serves to perform the function of transferring inscriptions from the sheet applied above the webbing to one of the strips of the webbing itself, and from the webbing to an underlying sheet or record member.

From the spool 21, the webbing W is trained upwardly and is passed longitudinally in a horizontal and forward direction over a protector plate or plates 24. In this instance, the plate 24 comprises a single flat body which is positioned on up-turned flanges 25 formed at the ends of an underlying parallel table panel 26. The plate 24 and the panel 26 at the rear ends thereof are suitably supported in connection with the upper portions of the bracket structure 20, while the forward portions thereof are connected with and supported upon a forwardly disposed bracket structure 27. The plate 24 is arranged immediately beneath the top wall 12 of the cover section 11 and is sufficiently spaced from said top wall to provide an elongated guideway 28 through which the horizontal length of the webbing W is passed as the same moves from the roll or spool 21 on which the webbing was originally wound to a forwardly disposed winding spool or roll 29 carried by the forward bracket structure 27. After passing through the guideway or channel 28, the webbing W is directed downwardly and is joined with the spool or roll 29 in a manner permitting the same to be wound thereabout when said spool or roll 29 is rotated in its supporting journals in the bracket structure 27.

The table panel 26 is located below and spaced from the upper protector plate 24 in a manner forming an elongated relatively thin and flat pocket 30 which is adapted for the reception of a lower record member 31, the latter usually taking the form of a merchandise ledger card, the same containing pertinent details of each customer's account.

In association with the records produced on the webbing W and the lower record member 31, the customers of a business concern are provided with a record sheet or card 32 which is adapted to be placed on the top wall 12 of the machine, with entry blanks appearing on the sheet or card 32 in registry with an inscription-providing slot or opening 33 formed in the top wall 12 intermediately of its length. To hold the upper record sheet or card 32 in a position providing for the writing of appropriate entries thereon, I utilize a hinged clamping plate 34. This plate is hinged along one of its longitudinal edges as at 35 to the top wall 12, and a coil spring 36 cooperates with the hinge construction in a manner normally causing elevation of the clamping plate 34 from the top wall 12 unless the clamping plate is positively held in its downward or active position, that is, the position of the plate shown in full lines in Fig. 3, as distinguished from the raised or inactive position of the plane as indicated by broken lines in Fig. 3.

Along its rear longitudinal edge, the plate 34 is equipped with a rubber strip or the like 37 which enters the inscription opening 33, so as to depress the upper record sheet or member 32 and bring the same into close engagement with the upper surface of the webbing W. Likewise, the table panel 26, in vertical registry with the slot or opening 33, is formed with a locally raised portion 38, which elevates the lower record member 31 in the region where inscriptions are applied thereto, bringing the same into close relationship with the webbing W. The pocket 30 opens at the right side of the machine, as it is viewed in Fig. 1, so that the lower ledger sheet or card 31 when positioned in the pocket will have its right edge exposed for manipulation purposes. The sheet or record 32 includes a plurality of parallel horizontal lines, intersected by vertical lines, forming boxes 39 in which inscriptions or entries may be made. At the extreme right of the sheet or card 31, a row of boxes is present containing consecutive numerals. The boxes in which these numerals appear are adapted to be registered with indexing spacers 40 provided stationarily on the top wall 12 adjacent its right edge, so that the spaces or boxes of the underlying record or card 31 may be aligned or registered with certain desired spaces appearing on the upper card or sheet 32. The latter, in this instance, as shown in Fig. 1, is provided at the left edge thereof with a row of boxes 41 containing consecutive numerals, and corresponding with those appearing in the spaces of the lower card, and the boxes 41 are adapted to be registered with spaced indexing marks 42 provided on the upper surface of a stationary strip 43 joined with the top wall 12. By this arrangement, a bookkeeping clerk may at all times readily ascertain the proper grouping of the various record sheets or cards arranged in their desired relative order, whereby an inscription applied to an upper record sheet will be transmitted to desired spaces on an underlying and concealed record space.

The upper record sheet or card 32 is held against movement while an inscription is applied thereto by the clamping plate 34, and the latter is located in its downward or active position by the movable bolt 44 of a latch mechanism 45. This latch mechanism is mounted on the top wall 12 contiguous to the forward end of the machine, and the bolt 44 projects over one edge of the plate 34 to hold the latter downwardly against the action of its elevating spring 36. The latch bolt 44 is pressed forwardly by a coil spring 46. To retract the bolt of the latch to permit of the elevation of the clamping plate, and the removal of an upper record sheet or card, or the placing of one of the latter on the top of the machine, the said bolt 44 is formed with a slot 47. Positioned in this slot is a beveled face lug 48, which is carried intermediately and laterally by the stem of a vertically movable plunger 49, the latter being mounted in guide openings formed in the housing of the latch mechanism 45.

The lower end of the plunger 49 engages with a head 50 provided on the upper end of a vertically movable stem 51, which is slidably mounted in connection with the forward bracket structure 27. A coil spring 52 surrounds the stem 51 and is interposed between the head 50 and a stationary ledge 53 of the forward bracket structure, so that the spring 52 serves to elevate the stem 51 and the plunger 49.

Midway of its length, the stem 51 is provided with a fixed collar 54, this collar engaging with the upper edge of a pivotally movable crank arm 55, the latter being mounted for oscillation on a stud 56 projecting stationarily from the forward bracket structure 27. The crank arm is slotted as at 57 to receive the lower portion of the stem 51, the extreme lower end of the stem 51 being provided with a cross bar 58 which carries at its outer ends rollers 59, the latter engaging with the inner surfaces of a holding pawl 60 and a ratchet-advancing detent 61.

The upper end of the pawl 60 is rigidly formed with one end of the arm 55, the pawl 60 and the arm 55 forming in effect a bell crank lever. The upper end of the detent 61 is pivoted as at 62 to one end of the arm 55, while the lower end of the detent engages with peripheral teeth provided on a ratchet wheel 63, the said wheel being fixed on one end of a cylindrical core 64 of the forwardly disposed spool or roll 29 for rotation in unison therewith. The lower end of the pawl 60 is also formed with an inturned finger 65 which engages the teeth of the ratchet wheel 63 in a manner normally preventing rotation of the spool or roll 29 in a direction winding the webbing W thereabout. A coil spring 66 has its ends secured to the pawl 60 and the detent 61, the spring serving to maintain the lower ends of the pawl and the detent in contact with the teeth of the ratchet wheel 63.

In the operation of the machine or register, a customer's card, sheet or other record 32 is first placed on the upper surface of the top wall 12 of the casing C below the normally elevated hinge clamping plate 34, with the entry-receiving portion of the record member 32 disposed in registry with the slot or opening 33 in the top plate. The lower record member or ledger card 31 is inserted in the pocket 30 and adjusted longitudinally thereon until the desired entry-receiving space or box appearing thereon is brought into proper registry with the inscription slot or opening 33. The clamping plate is then forced downwardly so that it will be retained in active clamping engagement with the upper record sheet 32 by the bolt 44 of the latch mechanism. The clamping plate serves to hold the upper record sheet in its proper position and to act as a rest for the hand of the clerk when an inscription is being made, protecting the upper record sheet against soiling. The rubber strip 37 on the clamping plate presses the upper record sheet downwardly in the opening or slot 33, holding the same in inscription-imparting relationship with the portion of the webbing W exposed through said slot or opening.

It will be noted that when the webbing W is operatively inserted into the machine, with the cover section 11 closed, access to the webbing W except through the slot 33 is prevented, so that the record afforded by the lower strip of said webbing will be preserved intact and prevented from being in any way changed or altered.

When the clamping plate is lowered to its active clamping position, the bolt 44 of the latch mechanism slides inwardly against the resistance offered by the spring 46 until the plate assumes its full lowered position. At this time the plate will occupy a horizontal plane below that of the bolt 44, so that the latter will be forced outwardly by the spring 46 to its plate-latching position. In this operation of the bolt 44, in which the clamping plate is locked in its down or active position, no movement is imparted to the plunger 49 by the sliding movement of the bolt 44. However, when it is desired to release the clamping plate, to cause the same to assume its upper, open or inactive position, whereby to permit the insertion of a record sheet beneath the same, it is necessary to depress the plunger 49. Such movement on the part of the plunger causes the lug 48 thereon to press the bolt 44 laterally against the resistance of its spring 46, retracting said bolt to allow the clamping plate to clear the outer edge of the same and move upwardly under the action of its spring hinge. The depression of the plunger 49 in attaining this operation is transmitted to the stem 51, which is moved downwardly by the plunger 49 against the resistance of the spring 52 of said stem. By reason of the collar 54 on the stem 51, downward movement of the latter rocks the crank member 55 about its pivot 56, so that the detent 61 is lowered to turn the ratchet wheel 63 in a direction winding the web W thereabout. In this operation, the holding pawl 60 swings outwardly about the axis of the stud 56, withdrawing the finger 65 of said pawl from locking engagement with the teeth of the ratchet wheel.

Thus with each operation of the releasing plunger 49 of the clamping plate latching mechanism 45, longitudinal movement will be imparted to the webbing to present a fresh and unused area of said webbing to the inscription opening 33. In my prior Patent No. 2,269,067 dated January 6, 1942, there is disclosed a register of this character wherein the carbon webbing is moved by a separate and individually executed manual operation. In the use of the device shown in my aforesaid patent, a clerk sometimes forgets to move the webbing, with the result that overlapping inscriptions occur on the record tape afforded thereby. This is avoided by the apparatus of the present invention in which the webbing is moved automatically whenever the latch mechanism is actuated to admit of the elevation of the clamping plate and the removal of a record sheet held thereby. Thus a fresh portion of the inscription-receiving area of the webbing will be at all times presented to the inscription opening in the top of the casing.

Simplicity in construction is provided by the present invention as well as complete accessibility of all parts. Upon the insertion of a key in the lock mechanism 17, the cover section may be released from the base section 10, allowing the cover section to swing about its hinge 16 to a position in which the web spools 21 and 29 may be readily reached for the purpose of applying webbing to or removing the same from the spooling rolls, as well as training the web through the guideway or channel 28 in the frame guides carried by the base section 10. When the cover section is raised, the plunger 49 lifts from the head 50 of the stem 51. This permits of raising movement on the part of the stem 51 so that the cross bar 58 and its rollers 59 may be moved to spread the pawl and detent 60 and 61 apart, removing their lower ends from the teeth of the ratchet wheel 63 so that the webbing may be wound on said spools or unwound therefrom in a convenient and expeditious manner.

I claim:

1. In a manifolding register, a casing formed with a top panel, movable clamping means carried by said panel for retaining a free record sheet on said panel in an entry-receiving position, spooling devices rotatably supported within said casing, a carbon inscription-transferring web joined at its ends with said spooling devices, the intermediate portions of said web passing in parallelism with said casing panel and beneath an opening formed in said panel with which the record sheet placed on the top of said panel registers, manually operated latch means for retaining said clamping means in its active position of record sheet clamping, said latch means including an operating stem, and pawl and ratchet means actuated by movement of said stem for imparting incremental movement to said spooling devices and the carbon web joined therewith.

2. In a manifolding register, a casing having a record sheet-receiving panel, the latter having formed therein intermediately of its length an inscription-receiving opening with which a record sheet positioned on said panel registers, movable means carried by said panel for clamping a record sheet in a fixed position on said panel in registry with said opening, a movable latch bolt mounted on said panel for retaining said movable clamping means in a position holding a record sheet against movement on said panel, spring means urging said bolt toward a position holding said clamping means against release, a manually operated plunger for moving said bolt against the resistance of said spring means to provide for the release of a record sheet from its retained engagement with said movable clamping means, a spring-pressed stem movably mounted in said casing beneath said plunger and adapted to be actuated by the plunger upon movement of the latter to release said latch bolt, a carbon paper web-binding spool rotatably mounted in said casing, and movable pawl and ratchet means actuated by said plunger for imparting incremental rotation to said spool.

3. In a manifolding register, a casing, a spool for the reception of carbon paper webbing rotatably supported in said casing, a ratchet wheel rotatable with said spool, a pivotally supported member, a detent pivoted at its upper end to said member, the free end of said detent being engaged with the teeth of said ratchet, a locking pawl engaged with the teeth of said ratchet wheel, said pawl being movable with said member, manually operated means accessible from the exterior of said casing for imparting rocking movement to said member and the detent and pawl connected therewith against spring resistance, means for detachably clamping a removable record-receiving sheet on said panel, and means actuated by said member-operating means for controlling the operation of the record sheet-clamping means.

WILLIAM DALE WINDERS.

References Cited in the file of this patent

UNITED STATES PATENTS

| Number | Name | Date |
|---|---|---|
| 511,854 | Leonard | Jan. 2, 1894 |
| 1,830,583 | Woller | Nov. 3, 1931 |
| 2,198,580 | McNabb | Apr. 23, 1940 |
| 2,256,533 | Taggart | Sept. 23, 1941 |
| 2,269,067 | Winders | Jan. 6, 1942 |
| 2,296,865 | Morse | Sept. 29, 1942 |